United States Patent [19]

Libby

[11] Patent Number: 5,850,617
[45] Date of Patent: Dec. 15, 1998

[54] SYSTEM AND METHOD FOR ROUTE PLANNING UNDER MULTIPLE CONSTRAINTS

[75] Inventor: Vibeke Libby, San Mateo, Calif.

[73] Assignee: Lockheed Martin Corporation, Sunnyvale, Calif.

[21] Appl. No.: 777,523

[22] Filed: Dec. 30, 1996

[51] Int. Cl.[6] .................................................... G06G 7/78
[52] U.S. Cl. .............................. 701/202; 701/23; 701/25; 701/209; 701/210
[58] Field of Search .................................... 701/200, 201, 701/202, 209, 23, 25, 117, 24, 208, 120, 207; 342/52, 55, 64, 458, 451, 462, 63, 29, 36, 39, 455; 340/988–989, 990–992, 995; 73/178 R

[56] References Cited

U.S. PATENT DOCUMENTS

| | | | |
|---|---|---|---|
| 5,272,638 | 12/1993 | Martin et al. | 701/202 |
| 5,559,707 | 9/1996 | DeLorme et al. | 701/200 |
| 5,623,413 | 4/1997 | Matheson et al. | 701/117 |

*Primary Examiner*—Jacques H. Louis-Jacques
*Attorney, Agent, or Firm*—Gary S. Williams; Flehr Hohbach Test Albritton & Herbert LLP

[57] ABSTRACT

A route planning mechanism receives a target set denoting a set of available targets, a set of target parameter thresholds for binning target parameters, a set of mission objectives and a corresponding set of mission thresholds for binning the mission parameters. The route planning mechanism may also receive an avoidance set denoting obstacles to be avoided. The mission objectives define a number of distinct target parameter priority orderings, each associated with a respective mission status. Successive best next targets are selected and added to a selected target sequence list until a mission completion criteria is satisfied. Each best next target is selected by determining a mission status in accordance with the previously selected targets, and a corresponding target parameter priority ordering. The target parameters of each available target are mapped into respective bin values in accordance with their respective target thresholds, and a cost function value is computed for each available target in accordance with the bin values. A subset of the available targets having a best cost function value is selected. That subset is successively narrowed until the subset contains only one target, and then that one target is selected as the best next target. The subset narrowing is performed using the bin values of the target parameters, applied in the target parameter priority ordering that is based on the current mission status. The resulting sequence of selected targets is then passed to a route utilization system, such as a satellite control system.

18 Claims, 9 Drawing Sheets

SYSTEM AND METHOD FOR ROUTE PLANNING UNDER MULTIPLE CONSTRAINTS

The present invention relates generally to route planning systems in which the goal is to maximize the value of the targets (or objects or sites) visited by one or more mobile systems, and more specifically is directed to a system and method for optimizing a route plan using a method whose computation time is linearly related to the number of potential targets available for selection and that selects an optimized set of targets in accordance with both local and global optimization criteria in a single computational pass.

BACKGROUND OF THE INVENTION

Referring to FIG. 1, the easiest way to understand the problem solved by the present invention is to consider the route planning problems faced by the routing engine for a satellite based agricultural site inspection system. For the purposes of this discussion we will assume that the satellite, while orbiting around the Earth in a low earth orbit, changes the attitude of its sensor array in order to collect data about specific target regions on the Earth's surface. For ease of discussion we will refer to a change of the sensor azimuth and elevation without worrying about identifying the specific attitude controlling device.

We will also assume for purposes of this example that there are many more targets (i.e., Earth surface regions to be studied) than the satellite can possibly "visit" (i.e., collect data from) during any single pass over the relevant Earth surface regions, that there is a maximum allowed "energy budget" allocated for each pass of the satellite over the targets, that there is also a "time budget" allocated for each pass of the satellite over the targets, and that some targets may be of greater value (economic or otherwise) than others.

The energy budget is limited so as to preserve the useful lifetime of the satellite, or simply because the satellite has inherent limitations on its permissible energy usage. Changing azimuth and elevation of the sensor array (also called changing the satellite's pointing vector) consume energy (as well as time). In addition, changing the satellite's pointing vector (also called the pointing vector position or pointing vector angle) to collect data from a particular target will impact the satellite's ability to reposition its pointing vector to point at subsequent targets.

The time budget is a mechanism for placing a value on the time required to reach a target and gather data from it. Some targets may have longer associated "dwell time" (i.e., the amount of time required for the satellite to acquire data regarding the target) than other targets. Thus, given the satellite's current position, trajectory, and pointing vector, there will be a given travel time associated with each possible next target, as well as an associated dwell time. Both target time and dwell time consume a portion of the available time budget.

The global goals of a routing system for such a satellite are (A) to maximize the number of targets or target values of the targets visited, and (B) to keep within predefined energy budget and time budget restrictions. In addition, the routing system may have a goal of positioning, or returning, the satellite's pointing vector to a particular position at predefined times. For instance, the satellite may be assigned a predefined pointing vector attitude at predefined "entry portal" and "exit portal" regions for each set of targets (or, equivalently, each mission region of interest).

On the other hand, the local goal of the routing planning system is to minimize a cost function each time it selects a next target. The cost function is typically a weighted sum of a predefined set of target parameters. While the values of some of the target parameters (e.g., travel time from the current satellite position to a particular target) vary during the route planning process, the cost function itself typically remains fixed during each iteration of the route planning process. In prior art systems, if the resulting planned route does not meet global constraints for the system, then the cost function is adjusted and the planning process is repeated.

Referring to FIG. 2, in a prior art route planning system 50, a route planning engine 52 receives a set of External Data Sets (EDS) 54 from an external data source 56. The external data sets include:

- a target set 60 (also called the target deck), which is a list of targets that are candidates for visits by one or more mobile systems;
- an avoidance set 62, which is typically a set of clouds or obstacles that can make some targets temporarily unavailable;
- a set of global constraints 64, which defines whether or not a selected sequence of targets 70 is acceptable; and
- an initial set of local constraints 66, which is typically a cost function used by the route planning engine to determine how a next target is selected for inclusion in a proposed target sequence.

Each time the route planning engine selects next a target from the target set 60, it is added to the selected target sequence 70, which is preferably stored in a FIFO (first in first out) buffer or in any other list storage mechanism that preserves the order in which the targets were selected. Once a final target sequence has been selected by the route planning system 52, the target sequence is passed to a route utilization system 72, such as a satellite route control system.

In addition, each time the route planning engine selects next a target from the target set 60, some of the parameters in the parameter set may require updating, for instance to take into account the position, trajectory, and pointing vector status of the route utilization system after visiting the most recently selected target.

Referring to FIG. 3, in a conventional prior art system the route planning engine 52 works as follows. A list of the targets remaining in the target list is read (80) and a best next target is selected (82) on the basis of "trade criteria", which is another term for a set of local constraints. The selected target is added to the selected target list (84). The selected target is also removed from the set of remaining selectable targets if the target is a fixed position target that is to be visited only once per mission. These steps are repeated, adding additional targets to the selected target list, until the amount of time required to visit all the selected targets reaches or exceeds a maximum allowed time value (86). At that point the selected target list is compared (88) with a set of "mission goals", which is another term for a set of global constraints. For instance, the local constraints might account only for target value and time expended acquiring those targets, while the global constraints might include limitations on fuel usage and the like.

If the selected target list meets the mission goals, then the route selection process is completed and the selected target list is output to a route utilization system (90). If the selected target list does not meet the mission goals, then the trade criteria (local constraints) 92 are modified (94) so as to hopefully select a better set of targets (e.g., a sequence of targets closer to minimum cost in accordance with the revised cost function), and then the target selection process is restarted.

The target selection process repeats as many times as may be necessary to find a selected target sequence that meets the mission goals. While it may be possible to determine an average amount of time for the route planning process, it is generally impossible to place an upper bound on the time used by route planning process, even if the computational process for selecting a set of targets is efficient. This inability to know with assurance that the route planning process will complete in a fixed amount of time is unacceptable in many commercial and other applications. For instance, if the set of available targets is subject to modification until just seconds (or minutes) before the route utilization system needs to begin visiting a selected set of targets, then the time required by the route planning process must have a well known upper bound.

The execution time problem of the above described prior art route planning mechanism derives from at least two major sources:
  the failure or inability to efficiently consider global constraints while using local constraints to select targets to include in a target sequence; and
  the use of computationally intensive techniques to select targets.

It is also important for a route planning system to operate in a consistent and predicable manner, so that identical route planning systems including one in a mobile route utilization system and one at a command or control center will both compute the exact same target sequence given identical sets of candidate targets. As a result, route planning systems based on neural networks are not suitable for systems in which predictability and reproducibility of results are required.

There is an implicit assumption in the above described prior art route planning mechanism that exactly the same selection criteria should be applied to select all targets in a target sequence. However, the present invention takes the opposite viewpoint: using static selection criteria for selecting all the targets in a target sequence is unlikely to produce optimal results. Rather, in accordance with the present invention, the local constraints for selecting targets should normally be revised one or more times during the target selection process in accordance with the "mission status". By keeping track of various parameters associated with the route utilization system's simulated mission status after visiting all the targets selected so far, the present invention modifies the local constraints on-the-fly during target selection so that the selected target sequence automatically meets global constraints. As a result, the route planning mechanism of the present invention can always select a near-optimal target sequence in a single pass.

There is also an implicit assumption in the above described prior art route planning mechanism that accurate application of the local constraints for selecting a next target requires precise and accurate computations. As a result, the prior art systems use computationally intensive techniques to select targets.

However, in a preferred embodiment, the present invention once again takes exactly the opposite viewpoint: whenever the target deck is much larger than the number of targets that can be visited in a single pass, relative inexact, simple computations, based on "binning" of the relevant target parameters, are more than sufficient for selecting a close to optimal target sequence. "Binning" target parameters is defined to mean mapping each target parameter (or combination of parameters, such as a combination of coordinate position values) into a small number of integer (or other) values. Local constraints are then applied to the bin values to select a best next target. Because the binning process is computationally simple and application of constraints to binned values is also very simple, the process of selecting a best next target is very computationally efficient.

In the above described prior art route planning systems, the amount of computation time required to select a target sequence meeting mission goals generally increases as a function of the square of the number of available targets. Thus, selecting a target sequence from a set of 10,000 available targets would generally take 100 times as long as selecting a target sequence from a set of 1,000 available targets.

In contrast, the present invention's computation time increases linearly with the number of available targets, and thus a ten-fold increase in the number of available targets results in only a ten-fold increase in computation time. Furthermore, the target parameter binning technique of the present invention makes the selection of a target sequence so efficient that many complex route planning tasks that formerly took hours of computation time are completed in just seconds when using the present invention.

It is therefore an object of the present invention to provide a route planning mechanism that simultaneously accounts for both local and global constraints while selecting a target sequence from a set of available targets so as to select, in a single pass, a target sequence that meets global constraints and that is also near optimal.

Another object of the present invention is to provide a computationally efficient route planning mechanism whose computation time increases linearly with the number of available targets.

Yet another object of the present invention is to provide a computationally efficient route planning mechanism that uses a target parameter binning mechanism to reduce the amount of computation time required to select each best next target in a target sequence.

SUMMARY OF THE INVENTION

In summary, the present invention is a route planning mechanism that operates in an environment in which the route planning mechanism receives a target set denoting a set of available targets, a set of target parameter thresholds for binning target parameters, a set of mission objectives (also known as global constraints) and a corresponding set of mission thresholds for binning the mission parameters. The route planning mechanism may also receive an avoidance set denoting a set of obstacles, objects or regions to be avoided.

The set of mission objectives define a number of distinct target parameter priority orderings, each target parameter priority ordering being associated with a respective mission status. For instance, one target parameter priority ordering may be used to select targets at the beginning of a mission, while other priority orderings may be more appropriate near the end of the mission, depending on depletion status of various mission resources.

Once the target parameters, mission sets and thresholds have been established, successive best next targets are selected and added to a selected target sequence list until a mission completion criteria (such as the expiration of the available mission time) has been satisfied. Each best next target is selected by performing the following sequence of steps.

A mission status is determined in accordance with all the previously selected targets, if any. The mission status is determined based on the amount of various mission resources (such as time, target values, and/or energy) that would be used by a route utilization system when visiting the previously selected targets. A target parameter priority ordering is also determined in accordance with the determined mission status.

The target parameters of each available target are mapped into respective bin values in accordance with their respective target thresholds. Also, a cost function value is computed for each available target in accordance with the bin values.

A subset of the available targets having a best cost function value is selected.

If the selected subset includes only one target, that one target is selected as the best next target.

If the selected subset includes more than one target, that subset is successively narrowed until the subset contains only one target, and then that one target is selected as the best next target. The subset narrowing is performed by removing from the subset all targets in the subset except targets having a best bin value for each successive target parameter, where the order in which the target parameter bin values are considered is the target parameter priority ordering based on the current mission status (i.e., global constraints).

The resulting sequence of selected targets is then passed to a route utilization system, such as a satellite control system.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
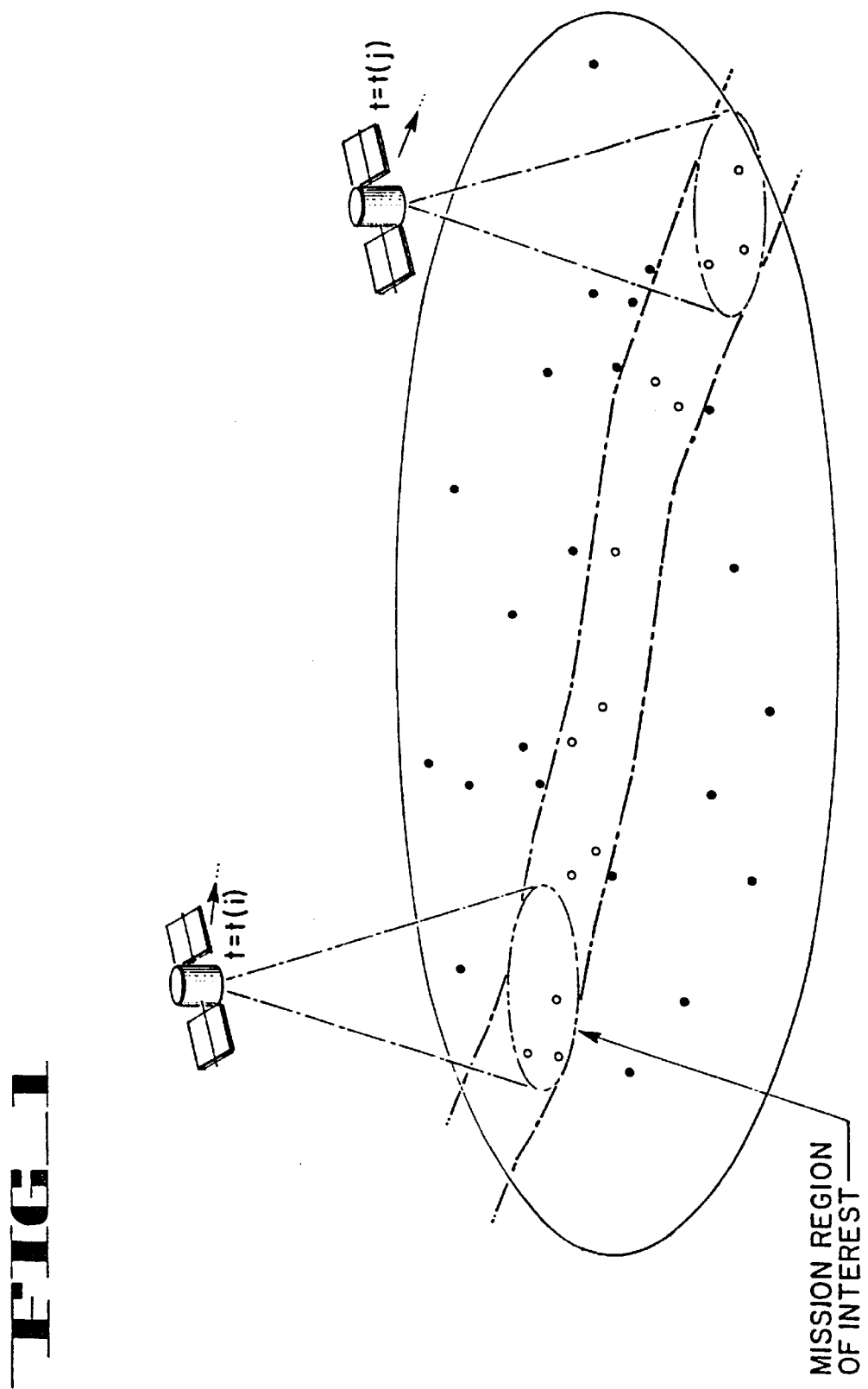
FIG. 1 depicts a satellite orbiting over a set of potential data acquisition targets.
Figure 2:
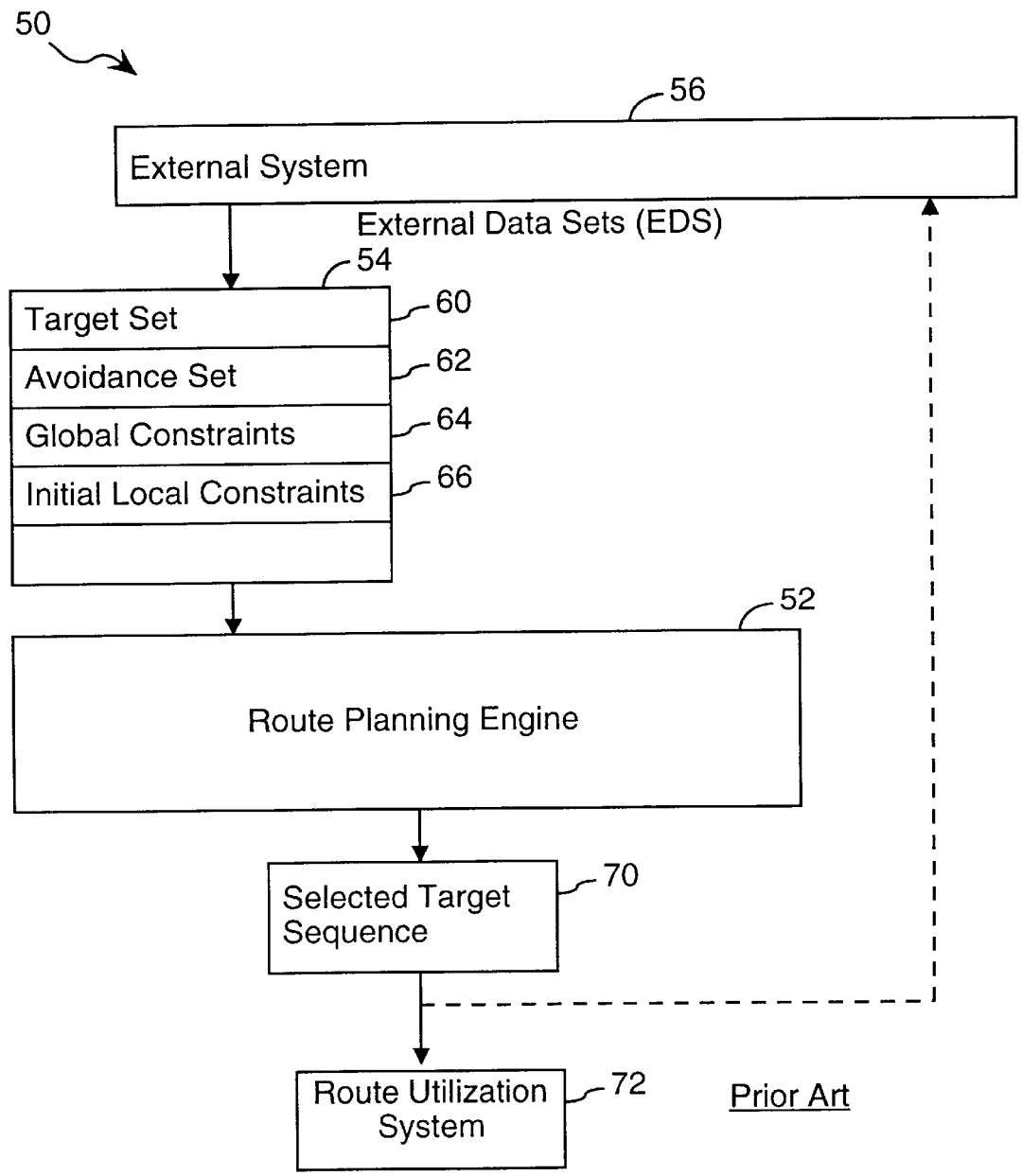
FIG. 2 depicts the information system context in which a typical prior art route planning system typically operates.
Figure 3:
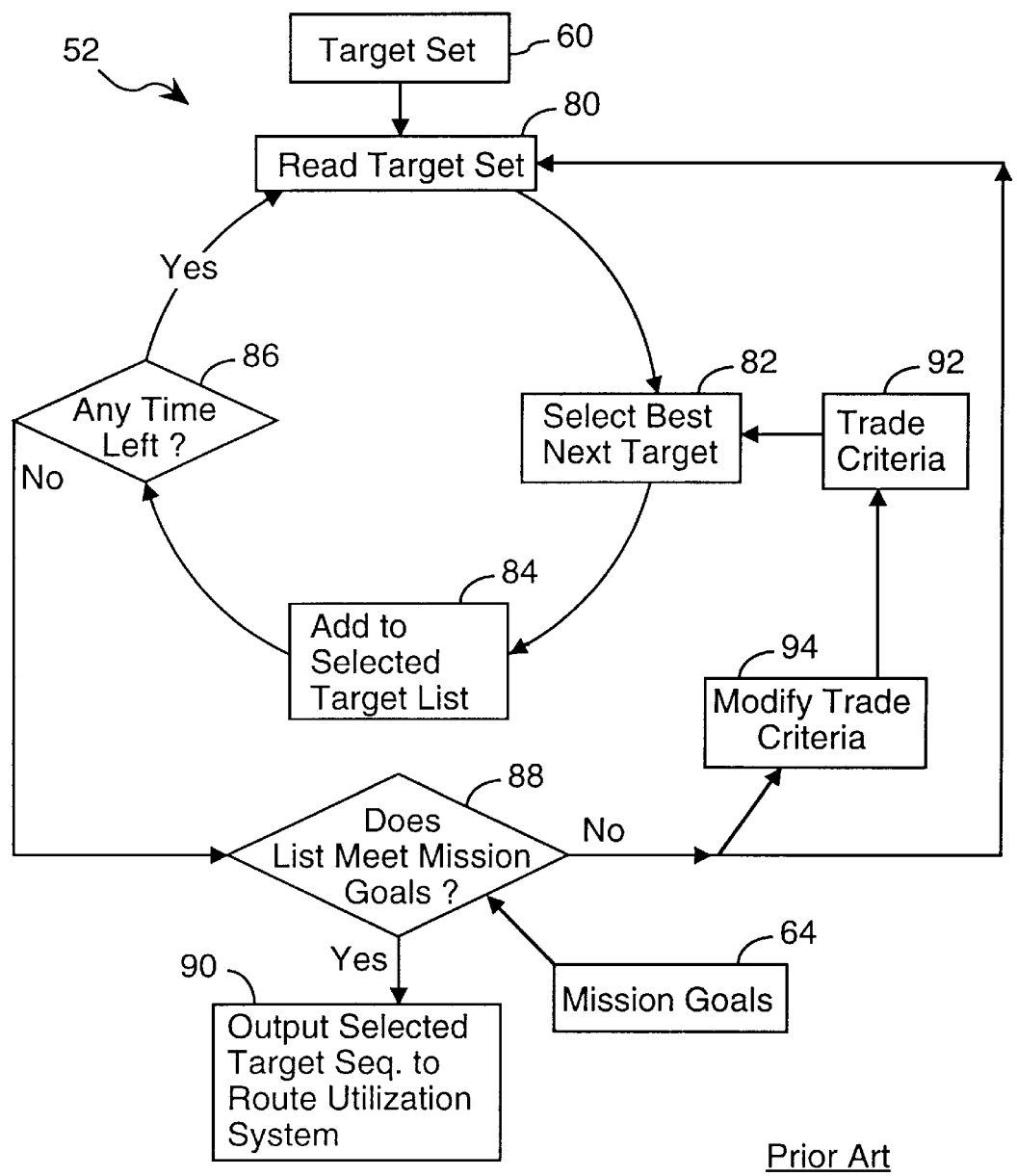
FIG. 3 is a flowchart for a typical prior art route planning system.
Figure 4:
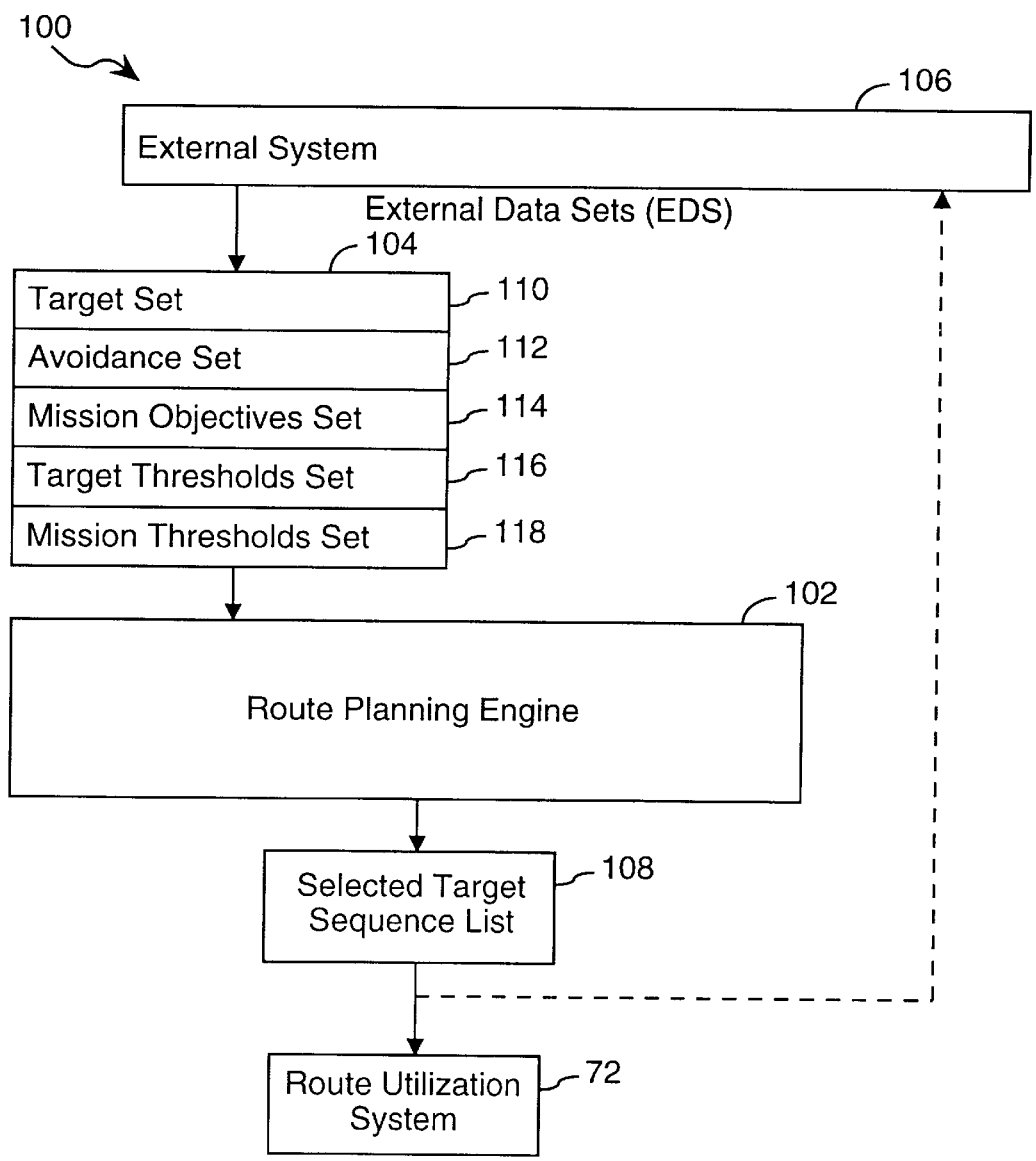
FIG. 4 depicts the information system context of a route planning system in accordance with the present invention.

Referring to FIG. 4, a route planning system 100 in accordance with a preferred embodiment of the present invention includes a route planning engine 102 that processes a set of external data sets (EDS) 104 received from an external data source 106 and produces a selected target sequence 108 for use by a route utilization system 72. The external data sets include:

a target set 110, which is a list of targets that are candidates for visits by one or more mobile systems, and includes all target parameters that are to be used by the route planning engine 102;

an avoidance set 112, which is typically a set of clouds, obstacles or the like that can make some targets temporarily unavailable;

a mission objectives set 114, which is a set of global constraints 114, which typically defines limits on usage of various mission resources such as time, energy and the like;

a target thresholds set 116, which defines threshold values used for binning the target parameters, as will be described in more detail below; and a mission thresholds set 118, which defines threshold values used for binning mission resource status values.

The mission objectives set 114 is generally defined in terms of a subset of the target parameters, and/or in terms of cost functions. For instance, a mission objective might be an energy usage limitation, and energy usage might be defined in terms angular change in the satellite's pointing vector.

Each time the route planning engine selects a next target from the target set 110, it is added to the selected target sequence list 108, which is preferably stored in a FIFO (first in first out) buffer or in any other list storage mechanism that preserves the order in which the targets were selected. Once a final target sequence has been selected by the route planning system 102, the target sequence list is passed to a route utilization system 72, such as a satellite route control system.

Figure 5:
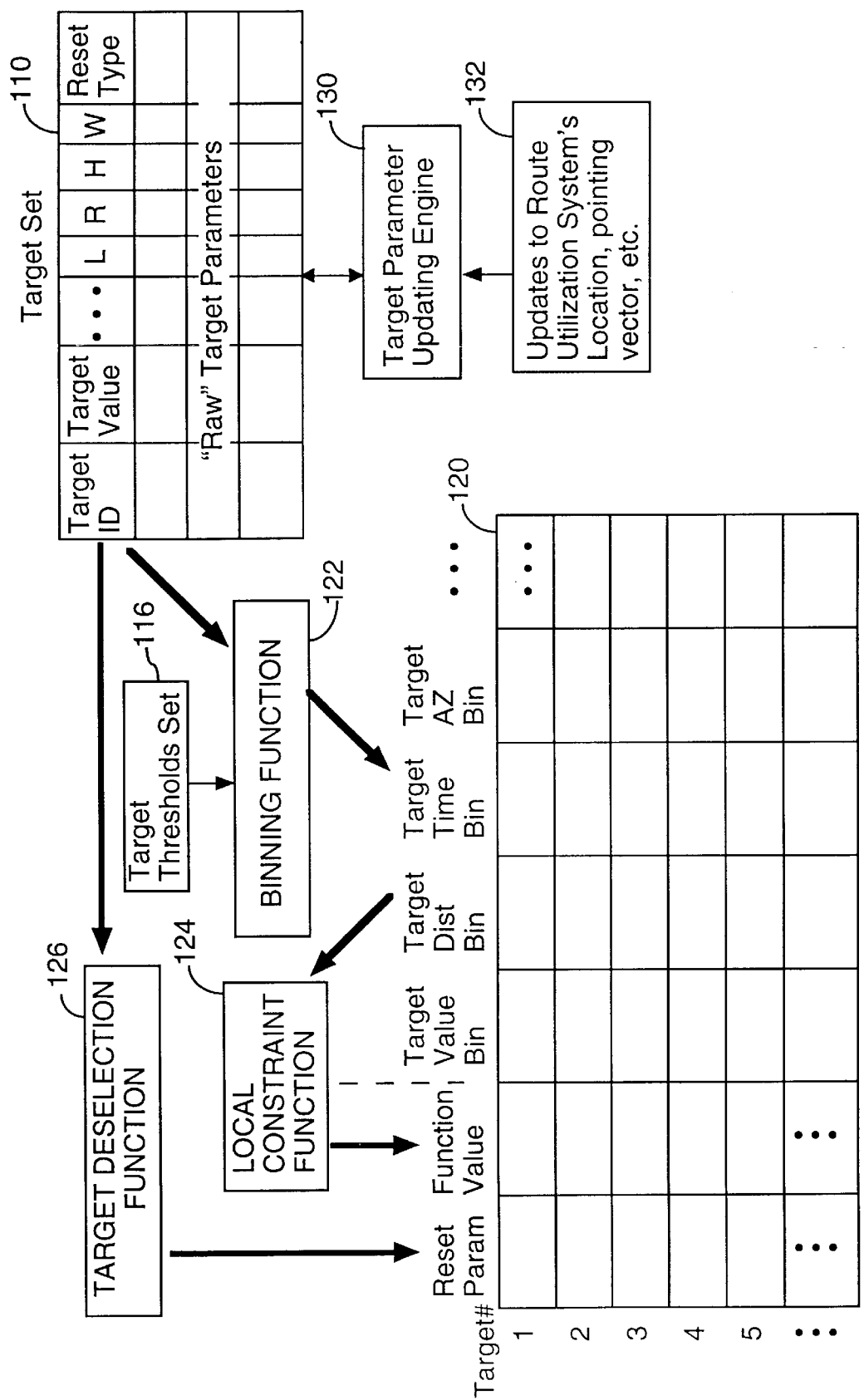
FIG. 5 depicts a target set storage data structure and the functions for binning target parameters used in a preferred embodiment of the present invention.

FIG. 5 shows a conceptual representation of the target parameter binned value data structure 120 used to store values associate with the target set. As shown, the raw target parameters associated with the target set 110 are converted into bin value by a binning mechanism or function 122. The binning mechanism 122 applies the externally provided target thresholds set 116 to map each target parameter into a corresponding bin value.

For instance, if the target thresholds of the "target distance" parameter are 10, 50, and 100 then target distances less than or equal to 10 (e.g., 10 kilometers) are mapped to a target distance bin value of 1, distances between 10 and 50 (e.g., 10 <distance<50) are mapped to a bin value of 2, distances between 50 and 100 are mapped to a bin value of 3, and distances over 100 are mapped to a bin value of 4. The thresholds in the target threshold set should be set or selected (via the external system) so as to subdivide the targets in a functionally meaningful manner. For instance, if there is no meaningful difference with regard to target selection between a target that is one kilometer away and one that is ten kilometers away from the route utilization's current position (e.g., due to the route utilization system's velocity and the minimum dwell time for any target), then the distance thresholds should be selected so as to assign all such targets to the same distance bin.

Typically, different target decks will have different target parameters thresholds. Different mission objectives will also require different target parameters thresholds.

Similarly, all the other bin values required by the routing engine are generated by applying a corresponding set of target thresholds to the relevant target parameters. In some instances, two or more "raw" target parameters may be utilized in the computation of a single bin value.

For the remainder of this document, the term "target parameter" will refer to any target related value that is mapped into a bin value; however, it is to be understood that some target parameters may represent the aggregation of more than one underlying "raw" parameter value. For instance, a single "distance parameter" may be derived from three raw coordinate values indicating a target position's location. Other target parameters, such as a target value parameter, may be associated with a single raw parameter value.

FIG. 5 also depicts a number of other mechanisms that affect the generation of the parameter bin values. The local constraint function 124 (also herein called the cost function) is used to compute a function value (sometimes called the cost or cost value) for each target (excluding deselected targets) from the previously computed parameter bin values. The local constraint function 124 is preferably a linear equation of the form:

$$F = A \times Bin1Value + B \times Bin2Value + C \times Bin3Value \ldots$$

The purpose of the function value computed for each target is discussed below. It should be noted that the local constraint function may be a function of fewer than all the target parameters. For instance, in the example shown in FIG. 5, the local constraint function could be the sum of target bin value, the target distance bin value and the target time bin value (i.e., with a coefficient value of 1 for coefficients A, B and C and a coefficient value of 0 for all other coefficients of the function). Note that the coefficients (A, B, C, ...) can be functions of system parameters (e.g., the mission status) without sacrificing the linearity of the cost function. Even when the cost function parameters are functions of system parameters, during the selection of a next target, a consistent, linear cost function is applied to all potentially available targets.

The reset parameter for each target is a mechanism used to temporarily deselect targets. In a preferred embodiment, each target in the target deck has a "reset type" and a current "reset value." A target's reset type indicates the rules used to set and change the target's reset value. Depending on the implementation, a wide variety of reset values can be used to indicate when the reset parameter should be reset to its default value. Exemplary reset parameter values are shown in Table 1A and exemplary reset types are shown in Table 1B.

TABLE 1A

Reset Parameter Values 0 not deselected: available for selection (Default value)
1 deselected only for purposes of selecting best next target (reset to default value after next target is selected and added to the target sequence list)
2 deselected for entire process of selecting target sequence (reset after selection of a target sequence is completed)
3 deselected forever, until reset parameter value is manually changed by system operator
4 deselected until next hour begins
5 deselected until next day begins

TABLE 1B

Reset Types

0 Standard: When target is selected and added to target sequence list, Reset Value is set to 2.
1 Moving Target: When target is selected and added to target sequence list, Reset Value is set to 1 (enabling the target to be visited multiple times during a single mission).
2 Undefined
3 Deselected forever. Set the Reset Value to 3.
4 When target is selected and added to target sequence list, Reset Value is set to 4 (deselect it until next hour begins, to make sure that target is visited no more than once per hour).

TABLE 1B-continued

Reset Types

5 When target is selected and added to target sequence list, Reset Value is set to 5 (deselect it until next day begins, to make sure that target is visited no more than once per day).

The target deselection function 126 is an optional feature of the preferred embodiment that is used primarily when the maximum number of visitable targets is much, much less than the total number of active targets in the target set (e.g., when the number of visitable targets is less than the number of active targets by a predefined margin, such as a factor of 20). In this circumstance, the target deselection function 126 is preferably used to deselect all but the highest value targets so that the set of available targets for which computations are performed is reduced to a set that is preferably only five to ten times larger than the maximum number of visitable targets. The targets deselected by the target deselection function 126 are all assigned a reset value that deselects those targets for the entire process of selecting a target sequence. This deselection process improves the computational efficiency of the routing planning system because the binning function and local constraint functions are not applied to any of the targets that have been deselected for the entire target sequence selection process or longer. Most importantly, it is no longer necessary to apply pointing vector updates (which are computationally expensive) to the deselected targets.

Another mechanism shown in FIG. 5 is the target parameter updating engine 130. This mechanism may be implemented either as part of the binning function, or as a separate mechanism for storing derived target parameters in the target set. Typical derived parameters are target distance (e.g., from a satellite's position after visiting the last selected target), and target pointing vector position (e.g., compared with a satellite's pointing vector position after visiting the last selected target). The target parameter updating engine 130 computes updated target parameters based on the route utilization system's simulated "current" location, orientation and the like (132) after vising the last selected target.

On the other hand, the "target time value" may be a static value known as "dwell time," representing the amount of time the route utilization system will use whenever it visits a respective target and thus the target time value would generally not require updating during the route planning process. As just indicated, the derived parameters may either be stored in the target set array 110, or may be used "on the fly" by the binning function to determine the bin values to be stored in the target parameter binned value data structure 120.

Figure 6:
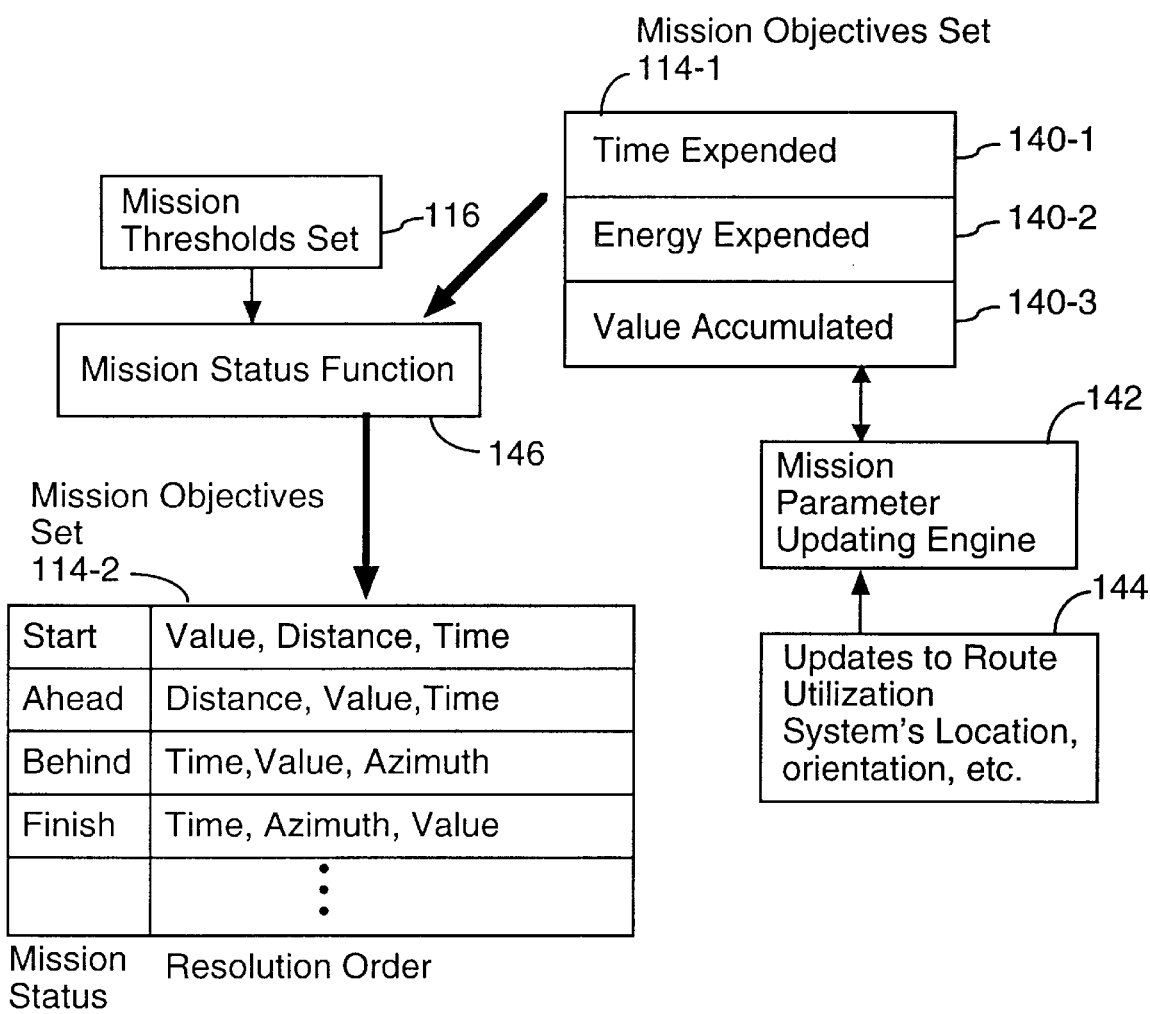
FIG. 6 depicts the data structures and functions used to determine mission status during the target sequence selection process.

Referring to FIG. 6, the way the preferred embodiment of the present invention applies global constraints (also called mission goals) during the target selection process is to generate a "mission status" value before each target selection. The mission status determines the order in which target parameter bin values are prioritized to select a best next target when more than one target is initially selected by the cost function binning process. For instance, if the prioritization order is "value, distance, time", then the set of potential best next targets will be narrowed to those with the best bin value for target value parameter before the values in the distance and time bins are used to further narrow the set of potential best next targets. By changing the order in which target parameter bin values are used to select targets, the selection of targets can be adjusted in the midst of target selection so as to ensure that the selected target sequence will meet the mission goals.

In the example shown in FIG. 6, at the beginning of the target selection process the time expended to visit a target is one of the lower priority target parameters, but when the percentage of the available mission time expended exceeds a threshold value (e.g., 80%), then time is assigned a much higher priority, causing the route planning system to prefer, among targets having equal cost function values, those targets that utilize lesser amounts of mission time, because time at that point has become a scarce resource.

In the example shown in FIG. 6, the mission objectives 114 have two components: a set of mission parameters 114-1 (time expended 140-1, energy expended 140-2 and target value accumulated 140-3) and a set of mission status values 114-2 and their associated target parameter bin value resolution orders. The mission parameters are updated after each target selection by a mission parameter updating engine 140. The mission parameter updating engine 140 utilizes information 144 derived from the sequence of selected targets to determine the updated value of each mission parameter 140. For instance, the time expended value 140-1 is updated based on the distance and time values of the selected target, the energy expended value 140-2 is updated based on changes in orientation and other energy using equipment parameters associated with the selected target, and the accumulated value 140-3 is updated based on the target value of the selected target.

The mission thresholds set 116 indicates how the mission parameters are to be converted into a corresponding mission status by a mission status function 146. For instance, a threshold of 80% of the available mission time might be set on the time expended parameter, a threshold of 75% of the energy budget might be set on the energy expended parameter, and a threshold of 70% of the maximum allowed accumulated target value might be set on the accumulated value parameter.

In general, there is a mission status for every possible combination of mission parameter bin values. However, the same mission status value may be used for multiple combinations of the mission parameter bin values. For instance the mission status may be defined as shown in Table 2.

TABLE 2

Mission Status Determination and Usage

| Mission Status | Threshold Settings | Resolution Order |
|---|---|---|
| Start | Value < 70% Time < 80% Energy < 75% | Value, Distance, Time |
| Ahead | Value ≧ 70% Time < 80% Energy < 75% | Distance, Value, Time |
| Behind | Value < 70% (Time ≧ 80% or Energy ≧ 75%) | Time, Value, Azimuth |
| Finish | Value ≧ 70% (Time ≧ 80% or Energy ≧ 75%) | Time, Azimuth, Value |

In alternate embodiments, the mission status could be updated less frequently, such as after every N target selections, or each time X% of the available mission time (or X% of any other mission resource) has been expended.

Figure 7:
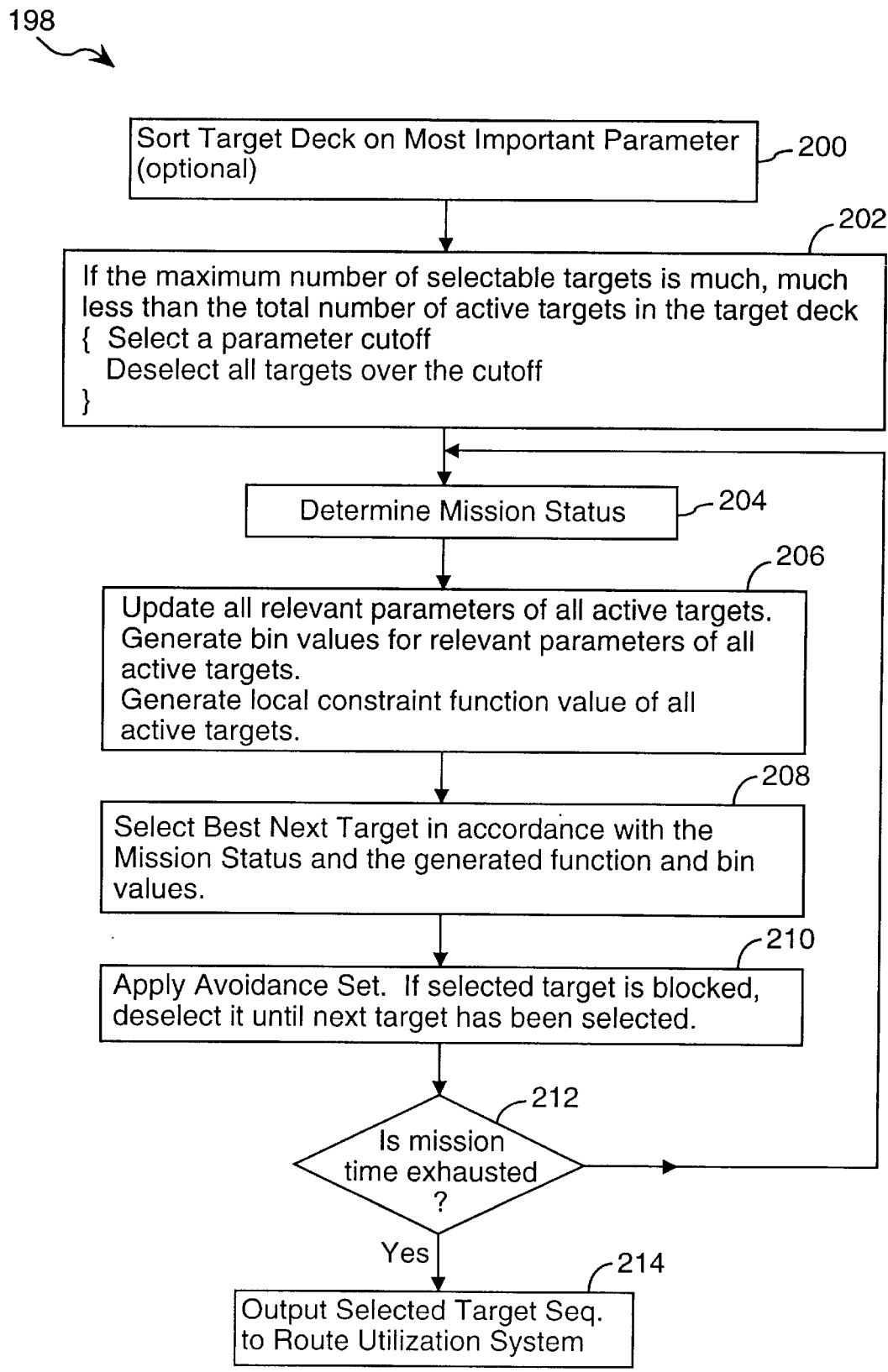
FIGS. 7 and 8 are flowcharts depicting the route planning method used in a preferred embodiment of the present invention.

Referring to FIG. 7, in a preferred embodiment the route planning mechanism executes a route planning procedure 198 (e.g., on a general purpose computer) that operates as follows. First, the target set (sometimes called the target deck) is sorted on a specified most important parameter, such as the target value (200). While this sorting step is optional (i.e., it is not necessary for implementation of the present invention), it improves computational efficiency because it tends to move the targets most likely to be selected to positions near the top of the target deck.

Next, in a second optional step for improving computational efficiency, if the maximum number of selectable targets (which may be in fact be a rough estimate, rather than a hard limit) is less than the total number of active targets in the target deck by a predefined margin (i.e., if the maximum number of selectable targets is much, much less than the number of targets available for selection), then a parameter cutoff is selected (e.g., a threshold target value) and all targets not meeting the cutoff are deselected for the purposes of the selecting the target sequence. As a result, the set of available targets for which computations are performed is reduced to a set that is preferably only five to ten times larger than the maximum number of visitable targets. The targets deselected by this target deselection step are all assigned a reset value that deselects those targets for the entire process of selecting a target sequence. This deselection process improves the computational efficiency of the route planning system because the binning function and local constraint function are not applied to any of the targets that have been deselected for the entire target sequence selection process, or longer. Step 202 is typically not used if the number of available targets is less than ten or twenty times the maximum number of selectable targets.

After the preprocessing steps 200 and 202 have been completed, execution of the main target selection loop (steps 204 to 212) begins. At step 204, the mission status is determined, which in turn determines the order in which binned target parameters will be used to select a best next target. As indicated earlier, in alternate embodiments the mission status may be updated at predefined intervals, instead of every time a best next target is selected.

Then, all relevant parameters of the active targets (i.e., all targets not deselected) that require updating (e.g., distance and orientation change parameters that are dependent on the route utilization's position and orientation) are updated. The resulting target parameters for all active targets are then binned using the target parameter threshold set, and then the local constraint function value is computed for all active targets (step 206). After these computation and binning steps, which are preferably performed using integer arithmetic operations wherever possible, the binned target parameters are used to select a best next target in accordance with the mission status (step 208).

Figure 8:
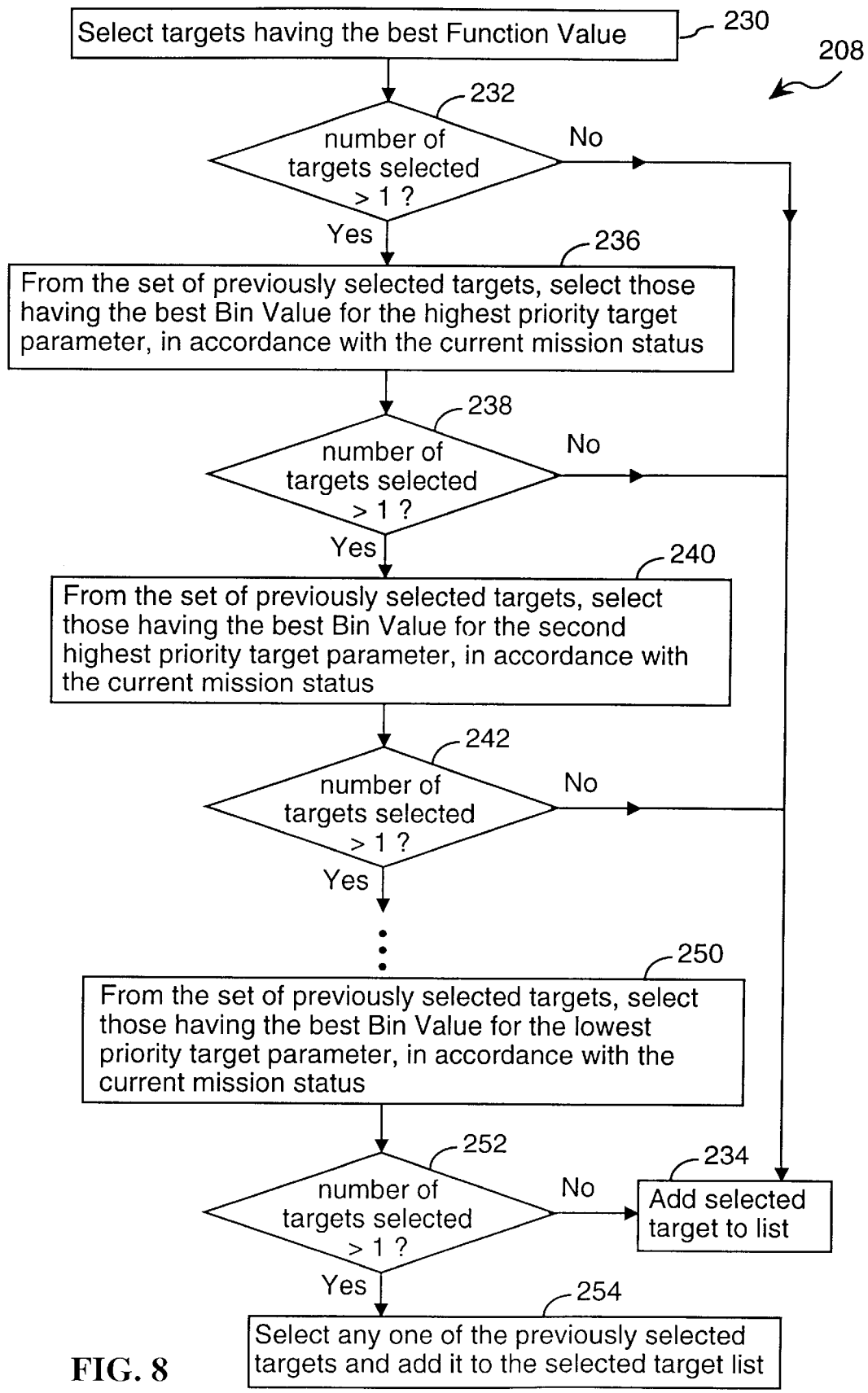

The subprocedure for selecting a best next target in accordance with the mission status is shown in detail in FIG. 8. First, all the active targets having the best function value are identified (230). In the preferred embodiment the best function value and the best bin values are the lowest values, but in other embodiments of the present invention some or all of the best function value and best bin values might be the highest value, or might be determined on some other basis altogether.

Step 230 is performed by determining the best function value for all active targets, and identifying and selecting all active targets having that best function value. If the number of targets selected in step 230 is equal to one (232), then the selection subprocedure is completed and the selected target is added to the target sequence list (234). Otherwise, additional steps (236–254) are used to identify a best one of the targets selected in step 230.

If the number of targets selected in step 230 is greater than one (232), then the highest priority target parameter is determined from the mission status. The best (e.g., lowest) bin value for that target parameter among the previously selected targets is determined, and all targets having that best bin value are identified and selected (236). In most cases step 236 will reduce the number of selected targets. If the number of targets selected in step 236 is equal to one (238), then the selection subprocedure is done and the selected target is added to the target sequence list (234).

If the number of targets selected in step 236 is greater than one (238), then the second highest priority target parameter is determined from the mission status. The best bin value for that target parameter among the previously selected targets is determined, and all targets having that best bin value are identified and selected (240). If the resulting number of targets selected in step 240 is equal to one (242), then the selection subprocedure is done and the selected target is added to the target sequence list (234).

The steps of successively narrowing the set of selected targets continues, as long as the set has not been reduced to a single target, until the lowest priority target discriminator (i.e., the lowest priority parameter) is reached. The best bin value for that target parameter among the previously selected targets is determined, and all targets having that best bin value are identified and selected (250). If the resulting number of targets selected in step 250 is equal to one (252), then the selection subprocedure is done and the selected target is added to the target sequence list (234). Otherwise (252-Yes), any one of the previously selected targets (e.g., the one highest in the target deck) is selected as the best next target and added to the selected target list. For purposes of this document, the "best" target with respect to the lowest priority target parameter is a target having the best bin value that is in the "best" target deck position (where the best target deck position is predefined in any appropriate manner).

Returning to FIG. 7, once a best next target has been selected using the bin based selection process, the avoidance set is applied to determine if the selected target is blocked. For instance, if there is an obstacle such as a mountain or a cloud that blocks the line of site between the route utilization system (e.g., a satellite) and the selected target, then the selected target is said to be blocked. If the selected target is blocked, its reset parameter is set to the appropriate reset value so as to make it unavailable for selection until a next target has been selected and added to the selected target sequence.

If the selected target is not blocked, it is added to the selected target sequence list, or more precisely is it not removed from the selected target sequence list by step 210. In an alternate embodiment, target selection step 208 would select a best next target, but not add it to the selected target sequence list. Step 210 would then add it to the sequence list if it is not blocked.

After the avoidance set has been applied, the procedure checks to see if the mission time (or any other limited mission resource) has been exhausted (212). If so, the selected target sequence list is output to the route utilization system (214). If not, yet another target is selected by repeating steps 204, 206, 208 and 210. These steps are repeated until a "full" sequence of targets has been selected (i.e., until one of the critical mission resources, such as time or energy, has been exhausted).

Due to the application of global constraints in step 204, there is no need to test the selected target sequence to see that it satisfies the global constraints, nor is there any need to reiterate the target sequence selection process so as to select a "better target sequence." The selected target sequence will be near optimal, where "near optimal" is defined in terms of the local constraint function and the mission goals.

Upon completion of the target selection procedure, the sequence of targets represented by the selected target sequence list is communicated to a route utilization system, such as a satellite. At the appropriate time, the route utilization system satellite follows the route represented by the selected target sequence list by changing its pointing vector at the appropriate times so as to gather data from all the targets in the list in the same order that the targets are listed.

Figure 9:
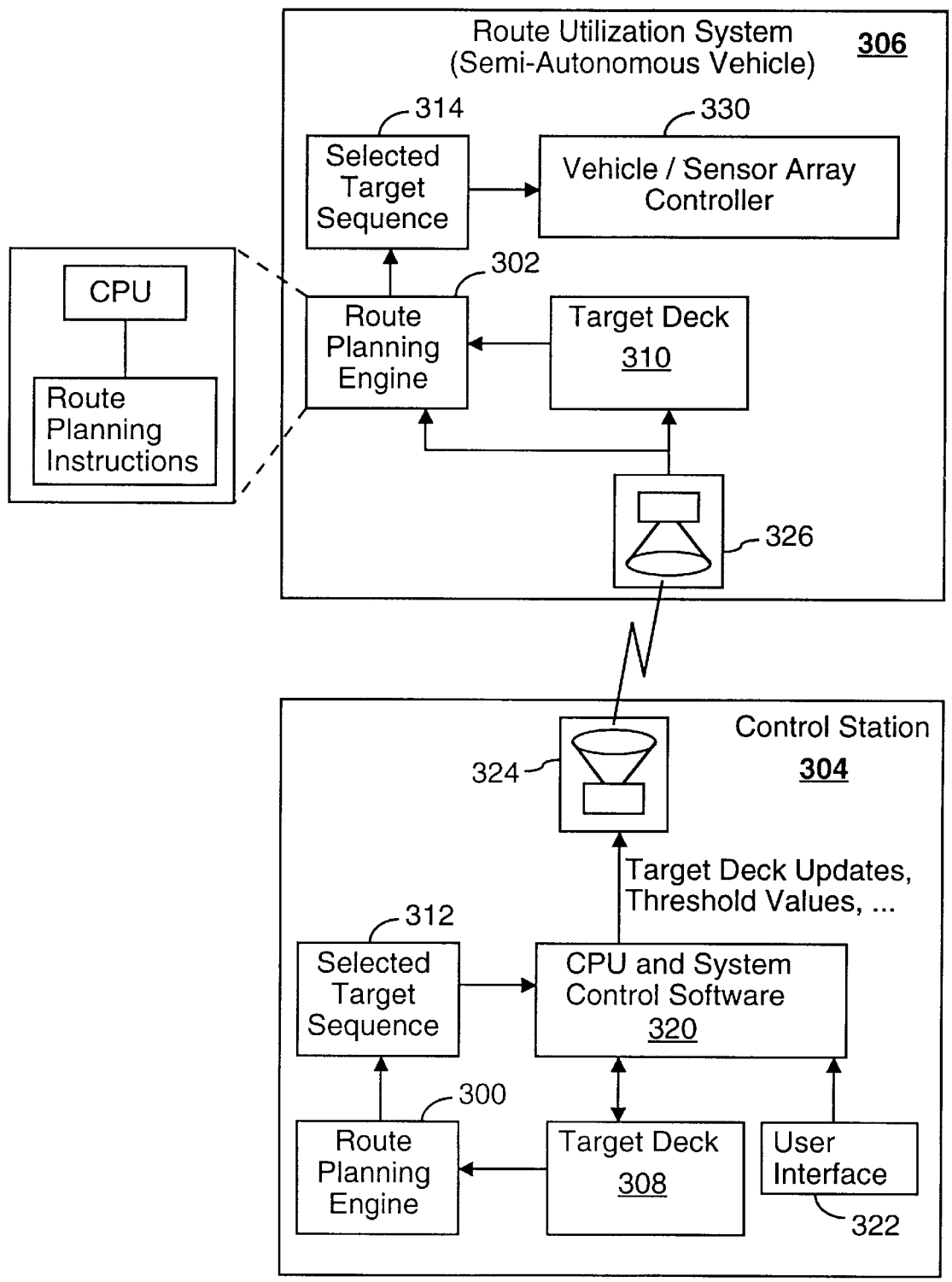
FIG. 9 depicts a system having parallel route planning engines in a semi-autonomous vehicle and a control station.

Referring to FIG. 9, a potentially important application of the present invention is the use of parallel route planning engines 300, 302 in an autonomous vehicle 304 and a control station 306. The use of this "dual planning engine" configuration is possible because of the reproducibility of the results generated by the route planning engine of the present invention. That is, two route planning engines 300, 302 having target decks 308, 310 with identical sets of potentially available targets, identical avoidance sets, mission objective sets, target thresholds and mission thresholds, will produce identical selected target sequences 312, 314.

In this configuration, the control station 304 has a control computer or CPU 320 that controls the operations of the control station 304 and indirectly controls the semi-autonomous vehicle 306. The control station 304 receives commands from end users via a user interface 322 (which may be local and/or remotely located with respect to the CPU 320), as well as new targets, changes in target values, and changes in threshold values, mission objectives and so on. External data sets are uploaded to the semi-autonomous vehicle 306 via wireless communication transceivers 324, 326.

In the prior art route planning systems known to the inventor, only the control station has a route planning engine. The target sequence generated by the control station is then uploaded into the vehicle or other system for utilization. However, in addition to the above-mentioned "unbounded route planning time" problem associated with prior art systems, a significant time bottleneck in the prior art systems is the time required for uploading the computed target sequence from the control system into the vehicle or other system for utilization. The target sequence uploading task requires the transfer of huge amounts of data, and generally must be repeated in its entirety if (A) any portion of the uploaded data is corrupted beyond the ability of the receiving system to correct it using embedded correction data, or (B) the control system revises any portion of the target sequence, such as to accommodate a special request that the vehicle visit one or more specified "must visit" targets.

Similarly, even in the embodiment of the present invention shown in FIG. 9, loading a complete target deck 308, 310 from the control station to the semi-autonomous vehicle typically requires the transfer of gigabytes of information and is usually a time consuming and error prone task. To reduce the need for complete reloads, the uploaded data typically includes a heavy overhead in terms of error detection and error correction data, which further bloats the size of the external data sets to be uploaded. In accordance with the embodiment of the present invention shown in FIG. 9, every target in the target deck has a unique target ID (see FIG. 5), and the control station can update specific portions and subportions of the external data sets, including specified parameters of specified targets, instead of having to perform an entire reload.

For instance, the target values of specified ones of the targets in the target decks 308, 310 can be revised by the control station without having to reload any other data in the semi-autonomous vehicle 306. Also, individual new targets can be added to the target decks 308, 310 without having to perform a reload. An high value use of this "targeted update" capability, in conjunction with the extremely fast route recomputation capability of the present invention, is the ability to upload a last minute target value update or new target with a very high assigned target value. Such updates can be used to assign one or a small number of targets very high ("must visit") values, along with a "recompute route" command. An example of an external data set update command sequence is shown in Table 3.

TABLE 3

External Data Set Update Commands

Update TargetID, TargetParam, Value
Update TargetID, TargetParam, Value
Update ParameterThreshold, Parameter, Threshold Set for Parameter
Recompute Route Command The revised target sequence 314 is then used by the controller 330 of the vehicle and/or its sensor array 330. As a result, the semi-autonomous vehicle 306 can be "forced" to visit high value targets on an emergency basis. Furthermore, due to the combination of the "targeted update" capability of the present invention and the extremely fast route recomputation capability of the present invention, target deck updates and/or other external data set updates can be uploaded to the semi-autonomous vehicle 306 right up to the last minute before the start of a mission, because the routing engine 302 of semi-autonomous vehicle 306 will be able recompute the initial targets of the route (i.e., target sequence) in just a few seconds, or even a fraction of second, depending on the underlying computational speed of the routing engine 302.

Because of the way the route planning engine of present invention works, it can be shown that the insertion of a high value target into the target deck will produce only a small perturbation on the target sequence that would otherwise have been selected by the route planning engine 308, 310. This can be deduced by considering how such "must visit" targets are handled by the routing engine of the present invention. Typically, as each "must visit" target comes within the simulated sensor range of the semi-autonomous vehicle 306 it will be assigned the lowest value (i.e., highest priority) by the cost function, and thus will be immediately selected as the next target by the routing engine. Once the high value target has been added to the target sequence, it will no longer affect the selection of subsequent targets, except to the extent that the state of the vehicle or its sensor array have been affected by visiting the high value target. As a result, the perturbation caused by the insertion of a small number of high value targets will usually be limited in scope.

Another application of the targeted update ability of the present invention is to allow the control station to upload target updates even while the semi-autonomous vehicle 306 is in the midst of a mission. In this situation, the routing planning engine 302 of the semi-autonomous vehicle 306 is commanded to recompute only the portion of the previously generated route that is subsequent to the target currently being visited by the vehicle, or subsequent to the next target to be visited by the vehicle in the event that the vehicle is in transit at the time of the update or is projected to be in transit between targets by the time the route planning/ recomputation process is completed.

Yet another application of the present invention is to use the route planning engine to plan the target sequences for multiple vehicles traversing similar (e.g., parallel), but not identical routes. In one implementation, the route planning engine independently plans the target sequences for each of the vehicles. Then overlapping targets in the target sequences of the different vehicles are identified, and each respective overlap target is then assigned to the vehicle which will use the least resources to visit that target. Prior to the present invention, automated multiple vehicle planning has not been practical due to the slow speed of the prior art route planning engines. In another implementation, the target sequences for the different vehicles are selected in series: after the first vehicle's target sequence is selected, the previously selected targets in the target deck are deselected and then the second vehicle's target sequence is selected. Each subsequent vehicle's target sequence is selected while all previously selected targets in the target deck are deselected.

The route planning engine of the present invention can be implemented in software for execution by a programmable general purpose, or even a special purpose, data processing unit. Alternately, the route planning engine of the present invention can be implemented in hardware, as a state machine. However, given the great efficiency of the route planning engine of the present invention, software implementations for execution on high speed CPUs is expected to be the preferred implementation. In such implementations the CPU used by the route planning engine will also typically be used to also perform other system control functions.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

It is noted here that the route planning engine of the present invention is universal, in that it is independent of the physics of the sensor device used to collect target data. Furthermore, the route planning engine is also applicable to vehicles, such as a ground based data collection vehicle or a drone airplane, whose trajectory is variable and subject to the control of an on board controller following a selected target sequence.

It is also noted that the route planning method of the present invention still works if the number of targets visited is equal to (or not much smaller than) the number of targets in the target deck. However, the solution (i.e., the selected target sequence) in this case will be further from optimum than when the target deck is much larger than the maximum number of visitable targets.

What is claimed is:

1. A route planning method, comprising steps of:

receiving target information concerning a set of available targets, the target information providing a set of target parameters for each of the available targets;

receiving sets of target thresholds, including a set of one or more threshold values for each of at least a subset of the target parameters;

receiving a set of mission objectives defining a plurality of distinct target parameter priority orderings, each target parameter priority ordering being associated with a respective mission status;

selecting a target sequence by repeatedly selecting a best next target and adding the best next target to a selected target sequence list until a mission completion criteria has been satisfied; and communicating a route, comprising the target sequence, to a route utilization system;

wherein
at a plurality of times while selecting the target sequence, the method includes determining a mission status in accordance with previously selected targets, if any, and determining a target parameter priority ordering in accordance with the determined mission status;

the step of selecting a best next target includes:
for each of at least a first subset of the available targets, mapping a plurality of the target parameters into respective bin values in accordance with respective ones of the sets of target thresholds, and computing a cost function value in accordance with the bin values;
selecting from the first subset of the available targets a second subset having a best cost function value;
if the second subset includes only one target, selecting the one target as the best next target; and
if the second subset includes more than one target, successively narrowing the second subset by removing from the second subset, for successive ones of the target parameters in accordance with the determined target parameter priority ordering, all targets in the second subset except targets having a best bin value for each of the successive target parameters until the second subset contains only one target, and selecting the one target as the best next target.

2. The method of claim 1, further including:
receiving an avoidance set denoting objects that block the route utilization system from visiting various ones of the targets;
the step of selecting a best next target further including:
after selecting the one target, applying the avoidance set to determine if the route utilization system would be prevented from visiting the selected one target, and when the determination is positive, deselecting the one target such that deselected one target is not added to the selected target sequence list.

3. The method of claim 2, the deselecting step including preventing future selection of the deselected one target at least until a best next target has been selected and added to the selected target sequence list.

4. The method of claim 1,
the received set of mission objectives further defining a set of mission resources and corresponding mission resource thresholds for the set of mission resources; and
the step of determining a mission status including:
determining values for the defined mission resources in accordance with all previously selected targets, if any; and
mapping the mission resources into respective mission resource bin values in accordance with respective ones of the mission resource thresholds, and determining a mission status in accordance with the mission resource bin values.

5. The method of claim 1, further including:
prior to the steps of repeatedly selecting a best next target, determining whether the set of available targets includes a number of available targets that exceeds a predefined maximum number of visitable targets by a predefined margin, and when the determination is positive, deselecting a subset of the available targets that do not meet a predefined high value target criteria so as to prevent consideration and processing of the deselected targets by subsequent steps of the method.

6. The method of claim 1, wherein the mission status determining step updates the determined mission status at predefined intervals, such that the mission status determination is updated less often than a best next target is selected.

7. A route planning method, comprising steps of:
uploading a data set from a control station to a semi-autonomous vehicle, the uploaded data set including:
an initial set of target information, the initial set of uploaded target information providing a set of target parameters for each of the available targets;
sets of target thresholds, including a set of one or more threshold values for each of at least a subset of the target parameters;
a set of mission objectives defining a plurality of distinct target parameter priority orderings, each target parameter priority ordering being associated with a respective mission status;
at the semi-autonomous vehicle, determining a target sequence by repeatedly selecting a best next target and adding the best next target to the selected target sequence list until a mission completion criteria has been satisfied; and
at the control station, independently determining a second, identical target sequence by repeatedly selecting a best next target and adding the best next target to a second selected target sequence list until the mission completion criteria has been satisfied;
uploading updates to the data set from the control station to the semi-autonomous vehicle so as to supplement and/or revise specified portions of the uploaded data set; and
after the updates uploading step:
at the semi-autonomous vehicle, redetermining the target sequence by repeatedly selecting a best next target and adding the best next target to the selected target sequence list until a mission completion criteria has been satisfied; and
at the control station, independently redetermining the second, identical target sequence by repeatedly selecting a best next target and adding the best next target to the second selected target sequence list until the mission completion criteria has been satisfied;
whereby identical target sequences are independently determined by the semi-autonomous vehicle and the control station, and the data set uploaded to the semi-autonomous vehicle is revised without re-uploading the entire updated data set from the control station to the semi-autonomous vehicle.

8. The method of claim 7, each of the target sequence determining steps and each of the target sequence redetermining steps including:
at a plurality of times while selecting the target sequence, determining a mission status in accordance with previously selected targets, if any, and determining a target parameter priority ordering in accordance with the determined mission status;
the step of selecting a best next target including:
for each of at least a first subset of the available targets, mapping a plurality of the target parameters into respective bin values in accordance with respective ones of the sets of target thresholds, and computing a cost function value in accordance with the bin values;
selecting from the first subset of the available targets a second subset having a best cost function value;
if the second subset includes only one target, selecting the one target as the best next target; and if the second subset includes more than one target, successively narrowing the second subset by removing from the second subset, for successive ones of the target parameters in accordance with the determined target parameter priority ordering, all targets in the second subset except targets having a best bin value for each of the successive target parameters until the second subset contains only one target, and selecting the one target as the best next target.

9. The method of claim 8, the data set uploading step including uploading from the control station to the semi-autonomous vehicle an avoidance set denoting objects that block a route utilization system from visiting various ones of the targets;

the step of selecting a best next target further including:
after selecting the one target, applying the avoidance set to determine if the route utilization system would be prevented from visiting the selected one target, and when the determination is positive, deselecting the one target such that deselected one target is not added to the selected target sequence list.

10. The method of claim 9, the deselecting step including preventing future selection of the deselected one target at least until a best next target has been selected and added to the selected target sequence list.

11. The method of claim 8, the set of mission objectives further defining a set of mission resources and corresponding mission resource thresholds for the set of mission resources; and the step of determining a mission status including:
determining values for the defined mission resources in accordance with all previously selected targets, if any; and
mapping the mission resources into respective mission resource bin values in accordance with respective ones of the mission resource thresholds, and determining a mission status in accordance with the mission resource bin values.

12. A route planning and utilization system, comprising:
memory for storing a data set, including:
target information, the target information providing a set of target parameters for a set of available targets;
sets of target thresholds, including a set of one or more threshold values for each of at least a subset of the target parameters; and
a set of mission objectives defining a plurality of distinct target parameter priority orderings, each target parameter priority ordering being associated with a respective mission status;
a route planning engine that repeatedly selects a best next target and adds the best next target to a selected target sequence list until a mission completion criteria has been satisfied; and
a route utilization system coupled to the route planning engine, that visits, in order, the targets in the selected target sequence list;
the route planning engine including a data processing unit, and instructions to be executed by the data processing unit, including instructions for:
determining, at a plurality of times while selecting the targets to be added to the selected target sequence list, a mission status in accordance with previously selected targets, if any, and determining a target parameter priority ordering in accordance with the determined mission status;
selecting the best next target by:
for each of at least a first subset of the available targets, mapping a plurality of the target parameters into respective bin values in accordance with respective ones of the sets of target thresholds, and computing a cost function value in accordance with the bin values;
selecting from the first subset of the available targets a second subset having a best cost function value;
if the second subset includes only one target, selecting the one target as the best next target; and
if the second subset includes more than one target, successively narrowing the second subset by removing from the second subset, for successive ones of the target parameters in accordance with the determined target parameter priority ordering, all targets in the second subset except targets having a best bin value for each of the successive target parameters until the second subset contains only one target, and selecting the one target as the best next target.

13. The route planning and utilization system of claim 12, the data set stored in the memory further including an avoidance set denoting objects that block the route utilization system from visiting various ones of the targets;

the route planning engine including instructions that:
after selecting the one target, apply the avoidance set to determine if the route utilization system would be prevented from visiting the selected one target, and when the determination is positive, deselect the one target such that deselected one target is not added to the selected target sequence list.

14. The route planning and utilization system of claim 13, the route planning engine including instructions that prevent future selection of the deselected one target at least until a best next target has been selected and added to the selected target sequence list.

15. The route planning and utilization system of claim 12, the set of mission objectives further defining a set of mission resources and corresponding mission resource thresholds for the set of mission resources; and the instructions for determining a mission status including instructions for:
determining values for the defined mission resources in accordance with all previously selected targets, if any; and
mapping the mission resources into respective mission resource bin values in accordance with respective ones of the mission resource thresholds, and determining a mission status in accordance with the mission resource bin values.

16. The route planning and utilization system of claim 12, the route planning engine including instructions for determining, prior to selecting any targets, whether the set of available targets includes a number of available targets that exceeds a predefined maximum number of visitable targets by a predefined margin, and when the determination is positive, deselecting a subset of the available targets that do not meet a predefined high value target criteria so as to prevent consideration and processing of the deselected targets by subsequent steps of the method.

17. The route planning and utilization system of claim 12, wherein the instructions for determining the mission status are executed at predefined intervals, such that the mission status determination is updated less often than a best next target is selected.

18. A route planning and utilization system, comprising:

a semi-autonomous vehicle, including a first wireless communication mechanism;

a control station, including a second wireless communication mechanism that coacts with the first wireless communications mechanism to upload a data set from the control station to the semi-autonomous vehicle, the data set including:

target information, the target information providing a set of target parameters for a set of available targets;

sets of target thresholds, including a set of one or more threshold values for each of at least a subset of the target parameters; and a set of mission objectives defining a plurality of distinct target parameter priority orderings, each target parameter priority ordering being associated with a respective mission status;

the semi-autonomous vehicle including a first route planning engine that determines a target sequence by repeatedly selecting a best next target and adding the best next target to the selected target sequence list until a mission completion criteria has been satisfied; and the control station including a second route planning engine that independently determines a second, identical target sequence by repeatedly selecting a best next target and adding the best next target to the second selected target sequence list until the mission completion criteria has been satisfied;

the control station including control mechanisms that, in conjunction with the first and second wireless communication mechanisms, upload updates to the data set from the control station to the semi-autonomous vehicle so as to supplement and/or revise specified portions of the uploaded data set;

the second route planning engine including logic for redetermining the target sequence using the updated data set;

the first route planning engine including logic for redetermining the target sequence, after the updates to the data set have been uploaded to the semi-autonomous vehicle;

whereby identical target sequences are independently determined by the semi-autonomous vehicle and the control station, and the data set uploaded to the semi-autonomous vehicle is revised without re-uploading the entire updated data set from the control station to the semi-autonomous vehicle.

* * * * *